United States Patent [19]
Bilas

[11] 3,762,487
[45] Oct. 2, 1973

[54] WHEELED VEHICLE SUSPENSION

[76] Inventor: Michael Bilas, 2730 Columbiana-New Castle Rd., New Springfield, Ohio 44443

[22] Filed: Oct. 18, 1971

[21] Appl. No.: 189,952

[52] U.S. Cl. ........ 180/24.09, 280/124 F, 280/81 R, 280/104.5 R
[51] Int. Cl. ............................................ B62d 61/04
[58] Field of Search ...................... 180/24.02, 24.08, 180/24.09, 22 D, 22 E; 280/124 F, 81 R, 112 R; 267/31

[56] References Cited
UNITED STATES PATENTS

| | | | |
|---|---|---|---|
| 2,477,925 | 8/1949 | Gentry | 280/104.5 R |
| 2,612,387 | 9/1952 | Ronning | 180/22 D X |
| 2,913,252 | 11/1959 | Norrie | 280/124 F |
| 2,989,300 | 6/1961 | Johannsen | 267/31 |
| 3,093,388 | 6/1963 | Kulyk | 280/81 R |
| 3,133,745 | 5/1964 | Granning | 280/112 R |
| 3,285,621 | 11/1966 | Turner | 280/81 R |

Primary Examiner—Kenneth H. Betts
Assistant Examiner—Reinhard Eisenzopf
Attorney—Webster B. Harpman

[57] ABSTRACT

A wheeled vehicle suspension positions tandem axle assemblies on the vehicle by way of semi-elliptic springs normally urging said tandem axle assemblies toward said vehicle so as to lift them from a road surface. Air bags are positioned between the tandem axle assemblies and the vehicle and means for inflating and deflating the air bags permit either or both of the tandem axle assemblies to be lifted from a road surface or engage therewith in a weight carrying relation to said vehicle.

4 Claims, 3 Drawing Figures

INVENTOR.
MICHAEL BILAS

WHEELED VEHICLE SUSPENSION

BACKGROUND OF THE INVENTION

1. Field of the Invention

This invention relates to wheeled vehicles and more particularly to suspensions for wheeled vehicles such as trucks and trailers.

2. Description of the Prior Art

Prior suspensions of this type have employed springs normally urging the wheeled axle assemblies toward the road surface and springs normally urging the wheeled axle assemblies away from the road surface and which latter arrangements incorporated air bags for urging the wheeled axle assemblies toward the road surface in the supporting relation to the vehicle.

(See U.S. Pat. Nos. 2,989,300, 3,063,732, 3,093,388, 3,096,995 3,133,745 and 3,285,621).

This invention eliminates some of the problems heretofore associated with the prior art vehicle suspensions and provides an arrangement wherein the tandem axle assemblies may be driven when in road engaging position and disconnected from the drive means when in elevated relation to the road. The invention makes possible the use of a plurality of wheeled axle assemblies in tandem relation to a vehicle, several of which may be elevated with respect to the road as desired.

SUMMARY OF THE INVENTION

A wheeled vehicle suspension is disclosed which enables at least a pair of tandem axle assemblies of a vehicle to be selectively elevated with respect to a road surface or engaged thereagainst in load carrying relation to said vehicle. The tandem axle assemblies are secured to the vehicle by springs normally urging the axle assemblies toward the vehicle and away from the supporting road surface and inflatable air bags between each of the tandem axle assemblies and the vehicle served to move the tandem axle assemblies toward the road surface as desired. The disclosure incorporates automatically actuating drive means for one of the tandem axle assemblies whereby it becomes a driven axle assembly when in engagement with the road surface and which driven connection is separated when it is in elevated relation to the road surface.

DESCRIPTION OF THE PREFERRED EMBODIMENT

Figure 1:
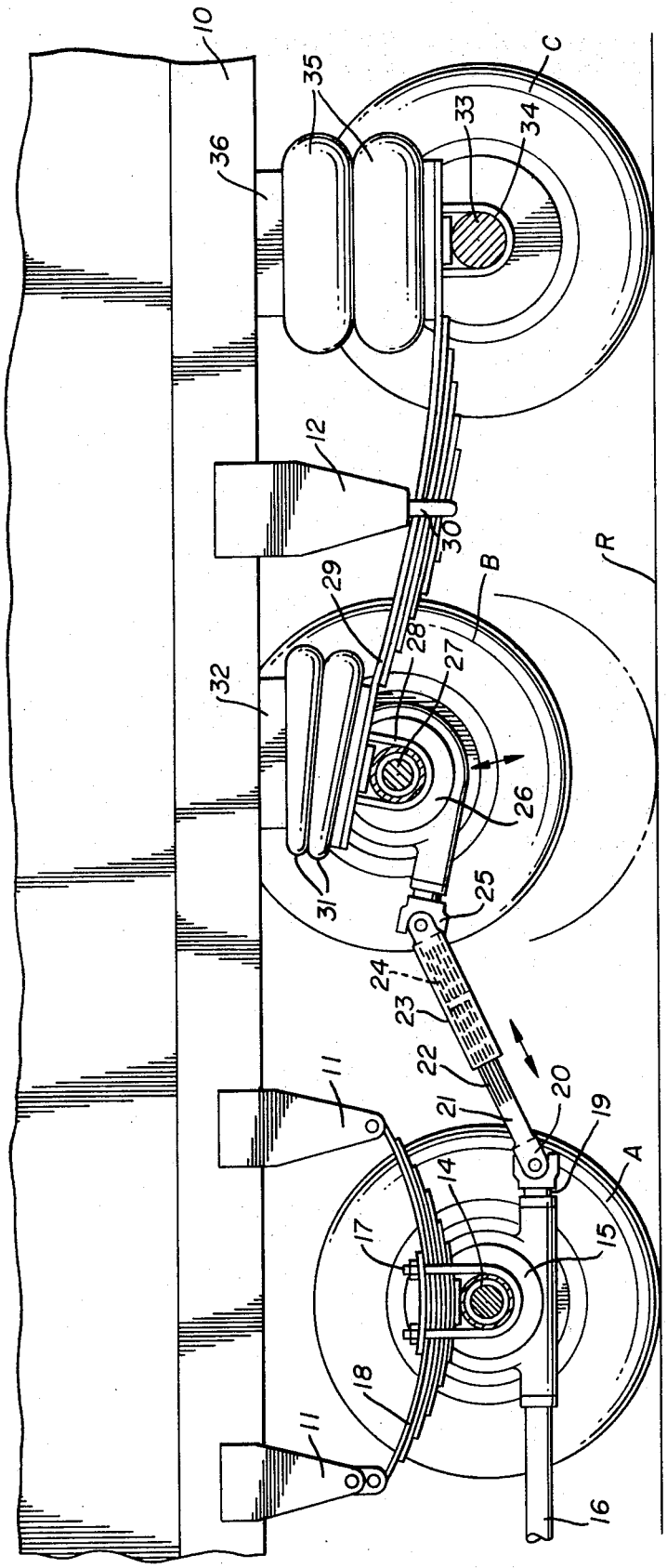
FIG. 1 is a side elevation of a wheeled vehicle with parts in cross section and parts broken away.

In the form of the invention chosen for illustration, and as seen in FIG. 1 of the drawing, a vehicle 10 is provided with spring suspension units 11 and 12 and a plurality of wheeled axle assemblies A, B, and C which are movably mounted on the vehicle 10 thereby. The wheeled axle assembly A includes a driven axle 14, a differential 15 for driving the same and a drive shaft 16 for imparting movement thereto. Shackle bolts 17 mount the axle 14 on a leaf spring 18 which in turn is pivoted to the spring suspension units 11.

The differential 15 is provided with a power take-off 19 to which a universal joint 20 is affixed. A driven shaft 21 continues from the universal joint 20 and the outer end thereof is splined as at 22 and the same is telescopically engaged in a tubular member 23, the innermost end of which is splined as at 24. The tubular member 23 is attached to one portion of a secondary universal joint 25 and the same connects with a secondary differential 26 on an axle 27 in the wheel and axle assembly B, which is spaced longitudinally of the wheel and axle assembly A. In FIG. 1 of the drawing the wheel and axle assembly B is shown in an elevated relation to the road surface R, and it will be seen that the axle 27 thereof is secured by a shackle bolt 28 to one end of a leaf spring 29, the central portion of which is secured by a mounting 30 to the spring suspension unit 12. The spring 29 normally urges the ends thereof and the wheel and axle assemblies B and C upwardly towards the vehicle 10.

The end of the spring 29, which is secured to the axle 27 of the wheel and axle assembly B, is engaged against an air bag structure 31 which is shown in FIG. 1 in deflated condition. The air bag structure 31 includes a mounting 32 secured to the vehicle 10. The other end of the leaf spring 29 is secured to an axle 33 in the wheel and axle assembly C by a shackle bolt 34 and a secondary inflatable air bag structure 35 is positioned thereabove and attached to the vehicle 10 by a mounting 36. The air bags 35 are illustrated in inflated condition whereby the wheel and axle assembly C is moved downwardly into engagement with the road R so as to assist in supporting the vehicle 10.

It will be understood by those skilled in the art that each of the axles 14, 27, and 33 has two ground engaging wheels thereon, and that the axle 14 is connected to the spring suspension units 11 by a pair of the springs 18 as customary in the art.

Figure 2:
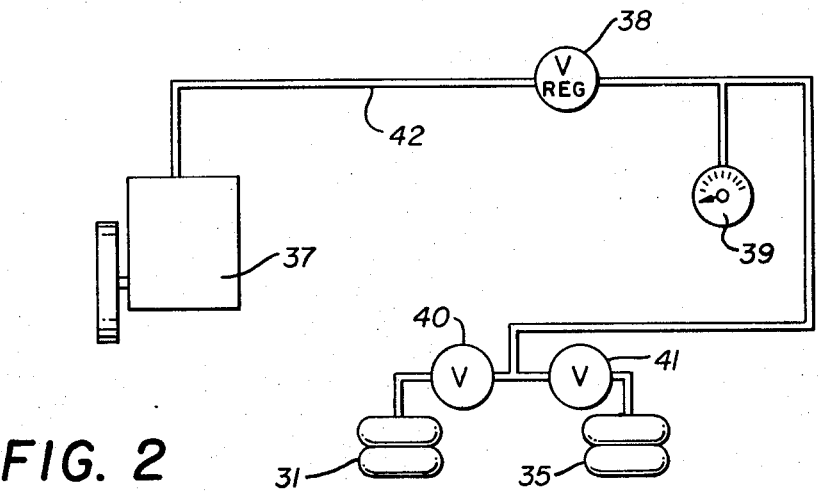
FIG. 2 is a symbolic diagram of an air inflation system for the air bags seen in FIG. 1 of the drawing.

The axles 27 and 33 are supported on the opposite ends of a pair of leaf springs 29, and there are pairs of the air bags 31 and 35 on each of said axles. By referring now to FIG. 2 of the drawing a symbolic illustration of means for inflating and deflating the air bags 31 and 35 individually may be seen. The same comprises a compressor 37, a pressure regulating valve 38, a gauge 39, a pair of control valves 40 and 41, and interconnecting air tubing 42 establishing communication between the compressor 37 and the pairs of air bags 31 and 35 respectively. By manipulating the valves 40 and 41, the wheel and axle assemblies B and C may be raised or lowered as will occur to those skilled in the art.

Figure 3:
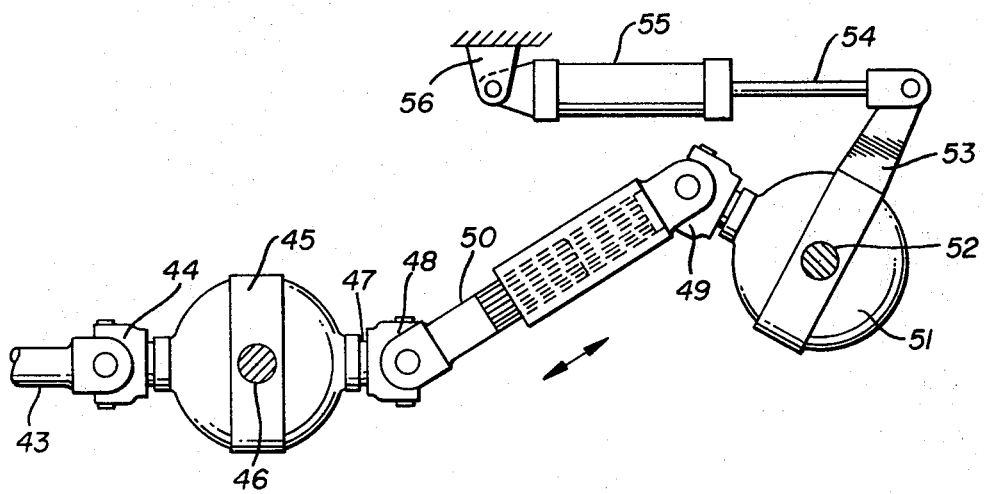
FIG. 3 is a side elevation with parts broken away illustrating an alternate means of assuring tilting motion to a driven axle assembly as seen in FIG. 1 of the drawing.

It will also occur to those skilled in the art that the wheel and axle assembly B may be an idler wheel assembly comparable with the wheel and axle assembly C, rather than the driven wheel and axle assembly as illustrated and hereinbefore described and in such event the splined telescopic drive shaft including the parts 21 and 23 is unnecessary as is the secondary differential 26. When the wheel and axle assembly is driven, as illustrated in FIG. 1 and heretofor described, auxillary means may be employed to insure the tilting of the axle 27 and the differential thereof so as to separate the splined portions of the telescopic drive shaft. By referring now to FIG. 3 of the drawing, such a construction may be seen. In the FIG. 3, the first drive shaft of a vehicle is indicated by the numeral 43 and it is connected by a universal joint 44 to a differential 45 on a first driven axle 46. A power take-off 47 is connected to a secondary universal joint 48 and the same is connected with a third universal joint 49 by way of a telescopic driven shaft 50, the respective portions of which are splined for selective engagement and disengagement depending upon the degree of telescopic engagement as will occur to those skilled in the art. A secondary differential 51 on a second axle 52 has an arm 53 extending upwardly therefrom and pivotly connected to one end of a piston rod 54, which is part of a piston and cylinder assembly 55, the other end of the cylinder being pivoted, mounted to a bracket 56 on the vehicle on which the wheeled vehicle suspension is employed. It will occur to those skilled in the art that by changing the position of the piston and piston rod 54 in the cylinder 55 the differential 51 will tilt relative to the axle 52 and thereby lengthen or shorten the telescopic drive shaft 50 and engage and disengage the splined portions thereof. Those skilled in the art will thus observe that when the axle 52 is elevated and tilted, the telescopic drive shaft 50 positively disconnects so that driving motion from the drive shaft 43 does not extend to the second axle 52.

It will thus be seen that an improved and simplified wheeled vehicle suspension has been disclosed which enables an operator of a truck or truck-trailer combination to lift one or two axles from ground engagement when in a no-load condition and thereby cut down on wear on the wheel and axle assemblies, which would otherwise take place, as well as reduce the number of wheel and axle assemblies on the truck for tax purposes and the like. At such time as the truck or truck-trailer combination is loaded, one or the other of the liftable wheel and axle assemblies may be elevated to facilitate turning on a sharp radius.

Although but one embodiment of the present invention has been illustrated and described, it will be apparent to those skilled in the art that various changes and modifications may be made in the invention without departing from the spirit of the same and having thus described my invention,

What I claim is:

1. A wheel suspension for a vehicle including first and second wheel and axle assemblies underlying said vehicle in tandem arrangement, spring means extending between said first and second wheel and axle assemblies, and means on said vehicle engaging said spring means centrally thereof, said spring means normally urging said wheel and axle assemblies towards said vehicle and air bags positioned between said vehicle and each of said wheel and axle assemblies for moving said wheel and axle assemblies away from said vehicle when inflated, and means for inflating and deflating said air bags.

2. The wheel suspension of claim 1 and wherein said spring means consists of a pair of leaf springs having a semi-U shaped configuration in unloaded condition with said wheel and axle assemblies secured to the opposite ends thereof.

3. The wheel suspension of claim 1 and wherein the means on the vehicle engaging the spring means comprises members extending downwardly from said vehicle and attached to said spring means centrally thereof so as to space said springs with respect to said vehicle.

4. The wheel suspension of claim 1 and wherein one of said wheel and axle assemblies is driven, and means including a drive shaft and differential are employed for driving the same, and a separable connection in said drive shaft is arranged to disconnect said driven wheel and axle assembly from said drive shaft when said wheel and axle assembly is elevated.

* * * * *